Figure 1:
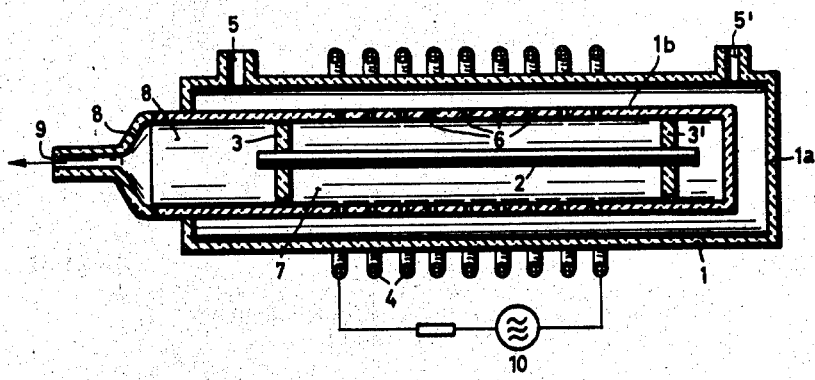

United States Patent Office 3,222,217
Patented Dec. 7, 1965

3,222,217
METHOD FOR PRODUCING HIGHLY PURE ROD-SHAPED SEMICONDUCTOR CRYSTALS AND APPARATUS
Josef Grabmaier, Munich, Germany, assignor to Siemens & Halske Aktiengesellschaft Berlin and Munich, a corporation of Germany
Filed Aug. 24, 1960, Ser. No. 51,630
Claims priority, application Germany, Sept. 23, 1959, S 65,059
9 Claims. (Cl. 117—213)

This invention is concerned with the art of producing highly pure rodshaped semiconductor crystals.

A known method of producing highly pure rodshaped semiconductors subjects a highly purified gaseous compound of the desired semiconductor to thermal decomposition and causes the semiconductor substance which is thereby separated to precipitate upon one or more rodshaped heated carriers, especially mono crystalline carriers made of identical material and disposed in a reaction vessel which may be made of quartz.

The present invention proposes improvements applicable to the above indicated method with the object of obtaining semiconductor rods exhibiting a higher degree of purity. According to the teaching of the invention, the carrier and the holding means therefore, which shall be made of quartz, are to be positioned in a reaction chamber completely surrounded by quartz walls. The heating of the carrier is to be effected by induction permitting positioning without the use of electrodes.

The invention is accordingly concerned with the art of producing rodshaped semiconductor crystals of highest purity, by thermal decomposition of a highly purified gaseous compound of the desired semiconductor material, which is preferably intermixed with highly pure hydrogen, effecting deposition or precipitation of the liberated semiconductor substance upon a highly pure, relatively thin, rodshaped and electrically heated carrier made of the identical semiconductor material, in a reaction chamber which is delimited solely by quartz surfaces. According to the invention, the carrier is with its quartz holders positioned within the reaction chamber and is, with the exception of the parts which are in direct engagement with the holder means, heated to the operating temperature and particularly the decomposition temperature of the gaseous compound, by an induction coil which is appropriately arranged outside of the vessel forming the reaction chamber.

While the present invention is primarily intended for use in the production of relatively thick rodlike silicon crystals, especially mono crystals, it may also be advantageously applied in the production of other semiconductor elements or semiconductor compounds, so long as no substances are liberated in the reaction which react with quartz. Highly purified halides or hydrogen halide compounds of the desired semiconductor, for example, $SiCl_4$ or $SiHCl_3$, used as reaction gas alone or preferably in admixture with hydrogen, are primarily employed for the production of semiconductor elements such as silicon. The precipitation temperature will depend upon the nature of the respective initial gaseous substance and shall not exceed the melting temperature of the respective semiconductor body. For example, when using as a reaction gas $SiHCl_3$ intermixed with hydrogen, the surface temperature of the carrier which is to deliver the heat required for the thermal decomposition of the gaseous phase, should be adjusted to about 1100° C. to 1350° C. and preferably to 1100° C. to 1200° C. The carrier is in such case heated by induction to produce the required surface temperature and the energy which is by induction applied to the carrier is thereby adjusted with the aid of a pyrometer or photocells.

The various objects and features of the invention shall now be described with reference to the accompanying drawing representing two particular embodiments of arrangements for practicing it.

Each embodiment comprises a generally cylindrical reaction vessel 1, made wholly of quartz, and forming a reaction chamber 7 in which is disposed a relatively thin semiconductor rod 2 extending parallel to the longitudinal axis of the vessel, and held therein by means of holder members 3, 3', made of quartz. The quartz walls delimiting the reaction chamber, that is, the walls of the reaction vessel 1 and also the holder members 3, 3' for the carrier 2 are, during the thermal decomposition and precipitation of the gas phase, advantageously cooled at least to such extent that the parts of the carrier which are in engagement with the holder members, are not appreciably heated by the action of the induction field employed, thus reliably preventing heating of such parts, namely, the quartz holders, and also of the parts of the reaction vessel, lying adjacent thereto, to such extent that gaseous components thereof are liberated which could lead to a contamination of the semiconductor material that is to be produced. The concept "not appreciably heated" is thereby related to the semiconductor material which is to be produced, and is in the case of semiconductor material respectively requiring or having a relatively low precipitation and crystallization temperature, less critical than in the case of a semiconductor material such for example as silicon carbide, requiring for its production a relatively very high temperature. The critical temperature at which contaminations contained in quartz begin to split off in small amounts, lies at about 800° C. The rule as defined above, accordingly directs that the holder means and the walls of the reaction vessel disposed adjacent thereto should not be "appreciably heated" to an extent at which the respective critical temperature is during the operation exceeded.

This may be achieved, in an arrangement according to the invention, for example, by dimensioning the induction coil 4 which embraces the reaction vessel 1 consisting entirely of quartz and therewith the carrier 2 contained therein, such that the ends of the carrier with the respective holder means extend beyond the turns of the induction coil so that they are not appreciably heated by the action of the induction field applied during the precipitation operation. This is obviously realized in the case of the embodiments according to FIGS. 1 and 2, in which the ends of the carrier rod 2 and the holder means 3, 3' respectively associated therewith are situated far outside and beyond the region of the reaction chamber 7 which is embraced by the induction coil 4. Cooling of the holder means 3, 3' and if desired also of the walls of the reaction vessel, applied alone or in cooperation with the structural features noted above, will take care of maintaining the holder means and the remaining parts of the apparatus at a temperature below the previously mentioned critical temperature.

The precipitation of highly pure semiconductor material can be obtained by the use of apparatus completely consisting of quartz in conjunction with the described measures for preventing excessive heating of parts bordering on the carrier or disposed in thermal heat exchange relation thereto, provided that initial gases of appropriate purity are employed.

Various methods which do not form part of the invention are available for producing with required purity the initial gases, that is, the applied semiconductor compound and the hydrogen that may be intermixed therewith. Reference may be made in this connection, for example, to various distillation and chemical purification methods as well as to the possibility of eliminating certain impurities by freezing. The corresponding purification operations are of course effected outside the reaction vessel 1 which receives the purified gases conducted thereinto. It is recommended to make the conduits serving for the supply of the reaction gases, which are disposed outside of the reaction chamber 7, likewise of quartz, at least insofar as parts thereof are concerned which are during the operation considerably heated.

It is moreover advantageous to provide the device for practicing the invention with a plurality of holes, for example, nozzle-like holes 6, formed in the wall of the reaction chamber 7 for the entry of the reaction gas, and coinciding with an area occupied by the carrier 2. A plurality of discharge openings for the spent reaction gas may be provided. In the embodiment according to FIG. 1, the reaction vessel 1 is provided with double walls, both walls being made of quartz. The reaction gas supplied through the inlets 5, 5' enters first the intermediate chamber formed by the outer wall 1a and the inner wall 1b and thereafter entering through holes 6 which may be nozzle-like holes formed in the inner wall 1b into the reaction chamber proper, indicated by reference numeral 7, in which is disposed the carrier 2 held by quartz disks 3 and 3'. The spent reaction gas, after flowing along the heated carrier 2, enters the discharge collector chamber 8 terminating in the gas discharge conduit 9 which is vacuumtight connected thereto and which is likewise made of quartz. The heating is effected by means of an induction coil 4 which is supplied from a high frequency source 10.

The part of the carrier 2 which is to be heated should be coupled with the induction coil 4 as well as possible. The possibility of good physical coupling by arranging the coil 4 so as to closely embrace the carrier 2 can be utilized only to a limited degree owing to the quartz wall means extending between the carrier and the coil. Another possibility resides in matching the carrier 2 to the induction source (induction coil 4 and high frequency generator 10) in a manner known from the communication technique, so as to obtain maximum energy transmission.

The quartz disks 3, 3' shown in FIG. 1 do not close the discharge collector chamber 8 gastight with respect to the reaction chamber 7, and the spent gases can therefore flow unhindered into the chamber 8 for discharge through the conduit 9.

The cap 8' terminating the gas collector chamber 8 is removable so as to gain access to the reaction chamber 7 for positioning therein the rod-shaped carrier 2 with its holders 3, 3'. The necessary gastight and vacuumtight joint between the removable cap 8' and the remainder of the reaction vessel is in known manner effected by finely ground fitting.

The arrangement described above with reference to FIG. 1 accordingly comprises a double walled reaction vessel 1, whereby at least a part of the space which extends between the walls 1a and 1b parallel to the carrier 2 serves for the supply of gases and communicates with the reaction chamber 7 through holes 6. The embodiment according to FIG. 2 is provided with different gas supply means, comprising, as shown, a quartz gas inlet conduit 11 extending into the reaction chamber in parallel with the carrier 2 and being provided with gas discharge openings 6 through which fresh reaction gas is as uniformly as possible conducted to the surface of the carrier 2 upon which is effected the thermal decomposition and precipitation of the liberated substance.

Figure 2:
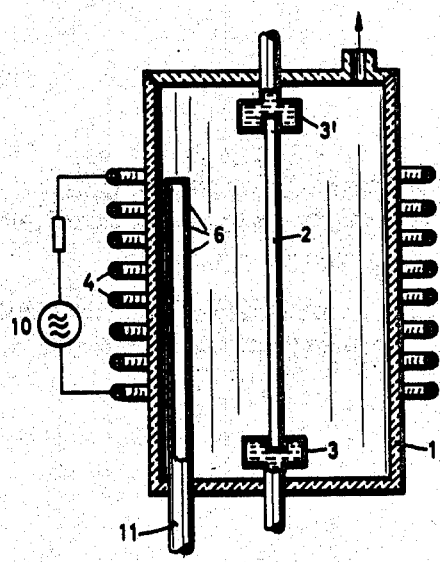

The holders 3, 3' shown in FIG. 2 are made of quartz and are fused to the end walls (lids or covers) of the cylindrical reaction vessel. They are hollow so as to permit intensive cooling thereof preferably by a flowing cooling medium. Access to the interior of the reaction chamber, for respectively positioning therein the carrier 2 and removing the rod therefrom which is produced by the reaction, may be effected by making at least one of the end walls of the vessel removable and replaceable in gastight and vacuumtight manner.

The following measures are to be observed in practicing the invention:

The carrier is first in known manner cleaned of surface contamination, by etching and is thereafter subjected to annealing in vacuum or in a stream of highly pure hydrogen gas, for a prolonged time, that is, for at least fifteen minutes prior to starting the precipitation operation. The annealing temperature thereby applied is to exceed the precipitation temperature, but shall be below the melting point of the respective semiconductor material. The object of the annealing treatment is to remove contaminations that could form on the carrier after the etching thereof. In the case of silicon, the annealing temperature amounts to about 1200° C. to 1400° C. and preferably 1200° C. to 1300° C. The mounted ends of the carrier shall be maintained in cold condition during the annealing operation; it may therefore be advisable to employ the described cooling measures already during the annealing. The thin semiconductor rods employed as carriers are at the desired degree of purity very high ohmic, especially in the case of silicon rods, and it is therefore necessary to resort to particular measures so as to initiate the heating and annealing operation. The carrier which is being subjected to the induction field which permeates it and which may be operated with increased intensity, can for this purpose be preheated by radiation and/or by respectively supplying to the reaction chamber hot hydrogen or inert gas, thereby effecting a falling temperature-resistance characteristic of the semiconductor material and consequently induction of increased current thereinto.

The preheating operation by radiation may be carried out, for example, by placing the reaction vessel 1 containing the carrier 2 mounted thereon, if desired after removal of the induction coil 4, into a radiation furnace. The induction coil 4 is placed in position directly upon removal of the arrangement from the furnace and the high frequency generator 10 is operatively connected. The high frequency current flowing through the coil 4 will now induce in the preheated carrier 2 strong currents so as to obtain further heating thereof to the desired annealing or precipitation temperature, respectively. The thermodynamic equilibrium between the energy supplied to the carrier and the energy given off thereby respectively by radiation and convection is obtained upon reaching this temperature. The reaction vessel 1 is during the preparatory annealing either evacuated or highly purified hydrogen gas is caused to flow therethrough.

It is of course entirely possible to arrange a plurality of carriers in the reaction chamber and to effect simultaneous precipitation thereon.

Changes may be made within the scope and spirit of the appended claims which define what is believed to be new and desired to have protected by Letters Patent.

I claim:

1. A method of producing rod shaped semiconductor crystals of very high purity, by thermal decomposition, at a highly pure, relatively thin rodlike and electrically heated carrier made of identical semiconductor material and positioned within a reaction chamber delimited by quartz walls, of a highly purified gaseous compound of the desired semiconductor material which is intermixed with highly pure hydrogen, thereby effecting liberation of said semiconductor material from the gaseous phase and precipitation thereof upon said carrier, the improvement which comprises, the steps of mounting said carrier on holder means made of quartz, positioning the entire carrier with the holder means therefor in said reaction chamber whereby the entire reaction structure involved, other than said carrier, is made of quartz, heating said carrier by induction means disposed outside of said reaction chamber, disposing the parts of said carrier which are directly in engagement with said holder means out of the induction zone, heating only the portions of said carrier intermediate said holder means to the operating temperature and particularly to the temperature required for the precipitation of said semiconductor material, and maintaining the temperature of the entire quartz structure below 800° C., whereby no substances capable of contaminating the produced semiconductor crystals are present in the reaction area.

2. The production of semiconductor rods according to claim 1, comprising the additional step of cooling the quartz walls delimiting the reaction chamber as well as the holder means for said carrier, during the precipitation, at least to an extent to prevent considerable heating of the parts of the carrier which are in engagement with the holder means.

3. The production of semiconductor rods according to claim 1, comprising the additional steps of subjecting the carrier to a preliminary treatment prior to effecting said precipitation, said treatment comprising etching of said carrier, and annealing said etched carrier for at least fifteen minutes in an atmosphere selected from the group consisting of vacuum and highly pure hydrogen at a temperature amounting to 1200° C. to 1300° C.

4. A device for producing rodshaped semiconductor crystals of very high purity, by thermal decomposition, at a highly pure, relatively thin rodlike and electrically heated carrier made of identical semiconductor material, comprising a reaction chamber delimited solely by quartz walls, in which said carrier is positioned, and adapted to receive a highly purified gaseous compound of the desired semiconductor material which is intermixed with highly pure hydrogen, thereby effecting liberation of said semiconductor material from the gaseous phase and precipitation thereof upon said carrier, an induction coil disposed in a surrounding relationship to said carrier at the exterior of said reaction chamber for heating said carrier, and a device including holder members made of quartz and respectively secured to the opposite ends of said carrier for positioning said carrier together with such holder members within said reaction chamber, said holder members and parts of the carrier disposed in engagement therewith extending beyond the operatively effective range of the turns of said induction coil to effect heating to the precipitation temperature only of parts of said carrier extending intermediate its opposite ends while maintaining the ends of said carrier at a lower temperature.

5. A device according to claim 4, comprising conduit means made of quartz and disposed outside of said reaction chamber for supplying reaction gases thereto.

6. A device according to claim 5, wherein openings are formed in the wall of the reaction chamber for supplying reaction gases to the carrier.

7. A device according to claim 6, comprising a conduit made of quartz for supplying reaction gas to said reaction chamber, said conduit extending into said reaction chamber and being positioned therein parallel to said carrier, holes being formed in said conduit for uniformly directing reaction gas to said carrier.

8. A device according to claim 6, wherein the reaction vessel is a double-walled quartz vessel, at least part of the space between the double walls serving for the supply of reaction gas to the reaction chamber which is delimited by the inner wall, holes being formed in said inner wall for directing reaction gas to the carrier positioned in the reaction chamber.

9. A device according to claim 4, wherein said holder members are hollow quartz members which are fused to parts of the quartz walls forming the reaction chamber, and means forming conduits for directing cooling medium into said holder members.

References Cited by the Examiner

UNITED STATES PATENTS

| | | |
|---|---|---|
| 2,854,318 | 9/1958 | Rummel. |
| 2,901,325 | 8/1959 | Theuerer _____ 23—223.5 |
| 2,904,404 | 9/1959 | Ellis _____ 23—223.5 |
| 2,967,115 | 1/1961 | Herrick _____ 23—223.5 XR |
| 3,017,251 | 1/1962 | Kelemen _____ 23—223.5 |
| 3,021,198 | 2/1962 | Rummel _____ 23—223.5 |

FOREIGN PATENTS 812,818   4/1959   Great Britain.

RICHARD D. NEVIUS, *Primary Examiner.*

M. A. BRINDISI, *Examiner.*